Aug. 2, 1960

C. L. CLEVENGER 2,947,081

METHOD OF FORMING A SPLINED SLEEVE

Filed Sept. 1, 1955

INVENTOR.
Carl L. Clevenger
BY
His Attorney

Aug. 2, 1960    C. L. CLEVENGER    2,947,081
METHOD OF FORMING A SPLINED SLEEVE
Filed Sept. 1, 1955    4 Sheets-Sheet 2

INVENTOR.
Carl L. Clevenger
BY John T. Marvin
His Attorney

INVENTOR.
Carl L. Clevenger
BY John T. Maroni
His Attorney

Aug. 2, 1960  C. L. CLEVENGER  2,947,081
METHOD OF FORMING A SPLINED SLEEVE
Filed Sept. 1, 1955  4 Sheets-Sheet 4

INVENTOR.
Carl L. Clevenger
BY John T. Marvin
His Attorney

United States Patent Office 2,947,081
Patented Aug. 2, 1960

2,947,081

METHOD OF FORMING A SPLINED SLEEVE

Carl L. Clevenger, Anderson, Ind., assignor to General Motors Corporation, Detroit, Mich., a corporation of Delaware Filed Sept. 1, 1955, Ser. No. 532,076

2 Claims. (Cl. 29—547)

This invention relates to a method and apparatus for cold forming metal parts and is more particularly concerned with the steps of manufacture and the apparatus utilized to cold form a plurality of spiralled inwardly facing splines on the internal surface of a tubular part.

It is an object of the present invention to cold form splines on the interior of a sleeve using an apparatus which will, sequentially, inwardly deform a portion of a sleeve to form a collar on one end, inwardly deform selected portions of the collar into grooves in an arbor, inwardly deform the remaining portions of the collar against the arbor, and finally size the sleeve against the arbor to provide a sleeve of predetermined diameter having interiorly disposed spiralled splines therein.

It is a further object of the present invention to cold form spiralled splines on the interior of a sleeve by a method which comprehends the steps of, sequentially, placing a sleeve over an arbor, inwardly deforming a portion only of the sleeve on said arbor to form a collar on one end, inwardly kinking selected portions of said collar into grooves in the arbor, inwardly compressing the remaining portions against said arbor to completely fill the grooves in the arbor with material of said collar and finally reducing the diameter of the tube against the arbor to provide a sleeve having a predetermined diameter with inwardly disposed splined ridges extending along a portion of the internal walls of said sleeve.

In the manufacture of clutch sleeves for starter drives for use with internal combustion engines, it has generally been the practice to cast and machine or to completely machine the spiralled splines on the interior surfaces of the sleeve. These practices are time consuming and usually result in a considerable waste of material and, thus, are directly reflected in the cost of the starter drives. The present invention is directed toward a reduction in the cost of internally splined sleeves such as are used in starting motor drives. Further, the type of sleeve herein contemplated is ideally suited to be used with the starter shaft which is formed according to the disclosure contained in application Serial No. 531,935, now Patent No. 2,782,633, concurrently filed herewith and assigned to the assignee of the present invention.

When the method and apparatus according to my invention is employed, a tubular part will be constantly maintained in position on an arbor while the various operations are sequentially performed to progressively compress selected portions of the tubular part, which initially has a greater diameter than the arbor, against the arbor so the formed sleeve will accurately fit the grooves of the spiral grooves in a shaft. I have found that, when the metal of a tube is compressed against a mandrel, a collar may be formed on one end of the tube and that this collar may be operated upon to form spiralled splines on the internal surface of the tube. Further, if these splines are to be accurately formed, the metal of the collar opposite the grooves in an arbor must be first inwardly kinked to at least partly fill the grooves prior to the inward compression of the remaining portions of the collar. When the resulting article, so formed, is sized by reducing the outer diameter of the tube in a sizing die, an internally splined sleeve will be formed which may have internal splines extending only a predetermined distance from one end.

In carrying out the above, the apparatus shown in the drawings is arranged so the tubular part from which the sleeves are formed is constantly maintained upon an arbor while other operations are sequentially performed thereon.

Further objects and advantages of the present invention will be apparent from the following description, reference being had to the accompanying drawings wherein preferred embodiments of the present invention are clearly shown.

In the drawings:

Figure 1, in perspective, shows a tubular part which is operated upon by the apparatus and method according to the present invention.

Figure 2, in perspective, shows the finished part as cold formed from the part shown in Figure 1.

Figure 3, in section, shows the apparatus for forming a collar on one end of the part in Figure 1.

Figure 4, in section, shows the apparatus for kinking selected portions of the collar as formed by the apparatus in Figure 3.

Figure 5, in section, shows the apparatus for compressing the kinked collar as formed by the apparatus in Figure 4.

Figure 6, in section, shows the apparatus for reducing the compressed collar as formed in Figure 5.

Figure 7, in section, shows the apparatus for sizing the part as formed by the apparatus shown in Figure 6.

Figure 1:
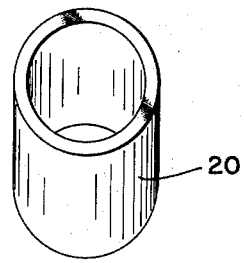
Figure 2:
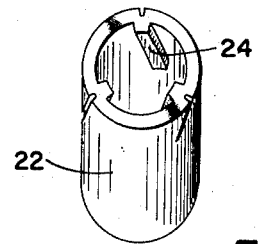

In the drawings, the numeral 20 designates a metallic part of predetermined length and diameter which will be operated upon by the apparatus and method according to the present invention. The numeral 22 is used to designate a formed sleeve which is formed from part 20 according to the present invention and which has internally and integrally formed splines 24 spirally disposed along the interior wall of the sleeve 22.

In Figures 3–7, a portion of a rotatable support table 26 is shown which has at least one opening through which a guide and support 28 projects. The support table preferably is a circular dial and is arranged to rotate and index the supports 28 under a plurality of stations where apparatuses as will be hereinafter described will sequentially perform a plurality of operations to form the internal splines on a sleeve 22. The guide 28 is suitably bored to receive an arbor 30 which is mounted to be vertically movable relative to to supports 26 and 28 by a suitable apparatus means, not shown. This latter mentioned means may include an air cylinder, an inclined cam surface, etc., and may be of any conventional type and is not specifically a part of the present invention. The arbor 30 extends upwardly through the support 28 and has a plurality of radially located spiralled grooves 32 which have lands 34 therebetween. The arbor 30 is also formed to have a shoulder 36 which will position the part 20 when the part 20 is placed over the grooved portion of the arbor 30. If desired, the arbor 30 may have a plurality of radially located and spaced flats 38 extending downwardly from the shoulder 36. The purpose of these flats 38 will be hereinafter described.

From the above arrangement of parts, it is apparent that the support 26 may be moved either rotatably or reciprocably beneath the apparatuses shown in Figures 3–7 and, because the arbor 30 is vertically movable, it will cause the tubular part 20 to be moved relative to the apparatuses in Figures 3–7 as required for the purposes which will be hereinafter apparent.

Figure 3:
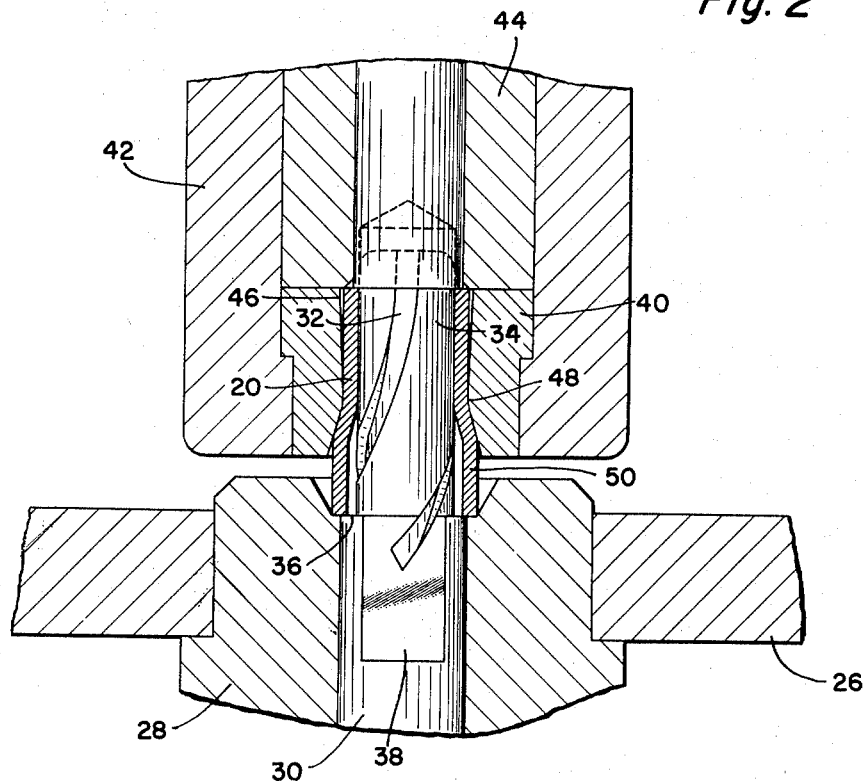

In Figure 3, a die 40 is arranged to be vertically moved relative to the arbor 30. The die 40 is carried by a ram of a punch press, not shown, by a die holder 42 and a die backup member 44. The die 40 has a central bore 46 which is provided with a tapered interior to provide a restriction 48 which will cause a portion of the diameter of the part 20 to be reduced as the die is moved downwardly toward the arbor 30 a predetermined distance. Thus, when the die 40 has moved a predetermined distance, that is, only partly over the length of the tube 20, a collar 50 will be formed on a portion of the tube 20 which has not been compressed. It is to be noted that, during this operation, the part 20 is vertically maintained in position by the support 28.

Figure 4:
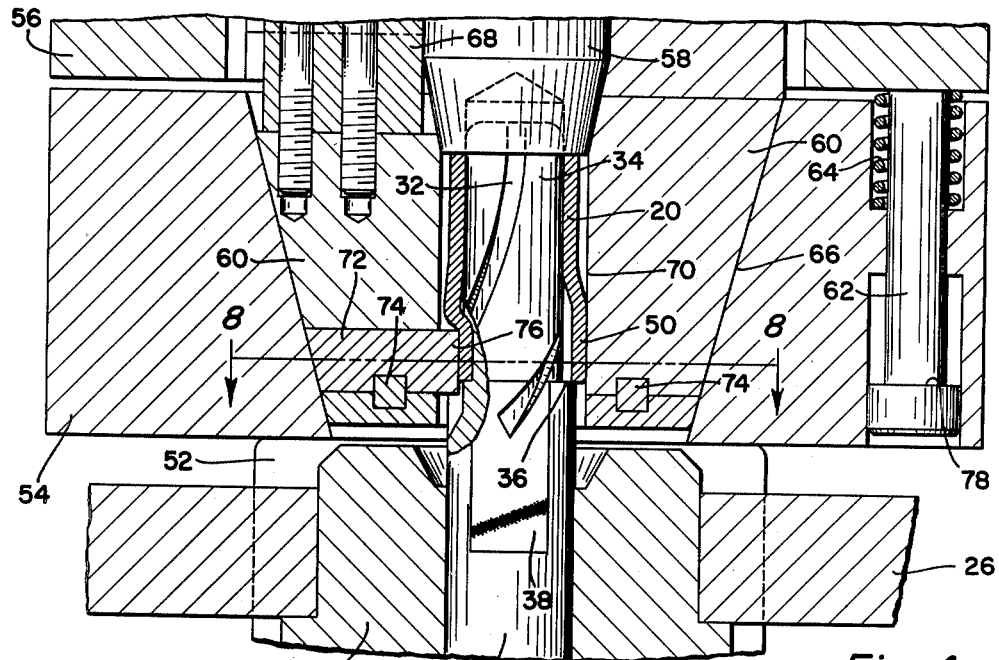

In Figure 4, the part 20 is shown to have been moved upwardly by arbor 30 and horizontally by the support 26 to a position vertically beneath an apparatus which will be hereinafter described. The apparatus in Figure 4 is attached to the ram of the punch press, not shown, and is vertically aligned above a stationary anvil 52. The apparatus shown in Figure 4 is arranged to kink selected portions only of the collar 50 and inwardly force these kinked portions so that they at least partially fill the grooves 32 which are disposed adjacent the collar 30.

Figure 8:
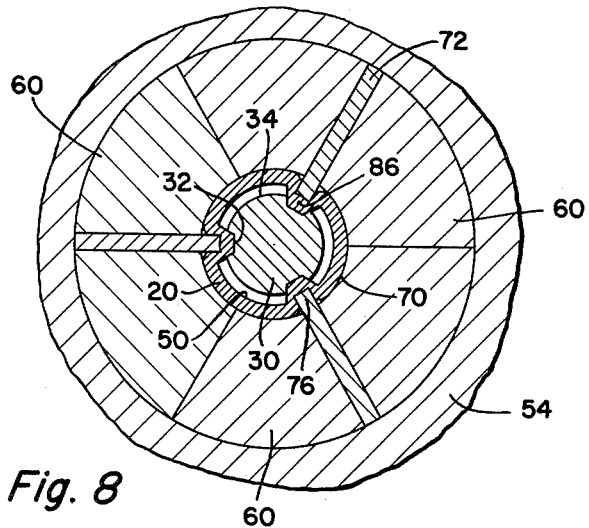
Figure 8 is a sectional view along line 8—8 in Figure 4.
Figure 10:
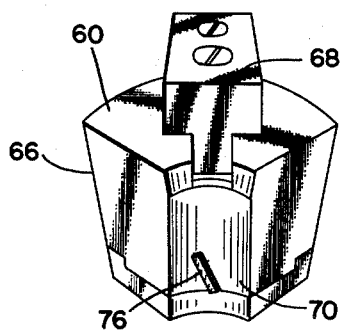
Figure 10 is a perspective view of one of the die segments used in the apparatus shown in Figures 4 and 8.
Figure 9:
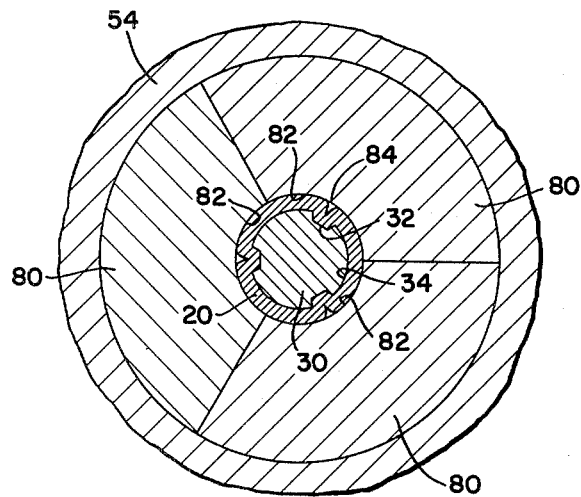
Figure 9 is a sectional view along line 9—9 in Figure 5.

The apparatus in Figure 4 includes a die holder annulus 54, a punch holder 56, a punch 58 and a plurality of pie-shaped segmental dies 60 all of which are carried by and arranged to be moved by the ram of the punch press, not shown. The punch holder 56 is carried by the punch press and, in turn, through pins 62 carries a die holder annulus 54 which is constantly urged downwardly and away from the punch holder 56 by springs 64. This arrangement of parts will permit the die holder annulus 54 to engage the anvil 52 before the punch holder 56 has completed its downward movement. The die holder segments 60 are most clearly shown in Figures 8 and 10, have sides 66 which are tapered to correspond with the taper of the inner walls of the die holder annulus 54. The segments 60 are each carried by a T-shaped part 68 which is carried by the punch holder so that the segments 60 may have a radial movement relative to arbor 30. When the segments are radially moved to the position shown in Figure 8, the bore which is defined by the curved surfaces 70 will have the same diameter as the collar 50. The die segments 60 are preferably provided with die inserts 72 which are held in position in the segments 60 by a key 74. These inserts 72 have a rib 76 formed and located in alignment with the grooves 32 and will force and kink the material of the collar 50 into grooves 32. This kinking operation is accomplished when the die segments 60 are forced inwardly toward the arbor 30 by the inclined wall 66 of the annulus 54. The punch 58 is arranged to be moved relative to the die segments 60 and engages the top end of the part 20 prior to the inward movement of the die segments 60. This punch will force the part 20 and the arbor 30 downwardly during the downward movement of the segments 60 to eliminate any relative vertical movement between the die segments 60, the arbor 30, and the part 20. From this arrangement, it is apparent that the only relative movement between the part 20 and the die segments 60 will be horizontal. When the ram of the punch press, not shown, moves upward, the die segments 60 will be moved upwardly and will move horizontally to a separated position while the punch 58 maintains the arbor 30 and part 20 in the lowered position. After the die segments 60 are moved upwardly a predetermined distance, the punch 58 is retracted so the arbor 30 may be moved upward by the mechanism, not shown, which preferably includes an air cylinder. After the above parts have moved upwardly, the collar 78 on pin 62 will engage the material of the die holder annulus 54 and cause this die holder 54 to move upwardly from its engagement with the annulus 52. This will permit the support 26 to move the arbor 30 beneath the apparatus shown in Figure 5 in preparation for the next operation to be performed on collar 50.

Figure 5:
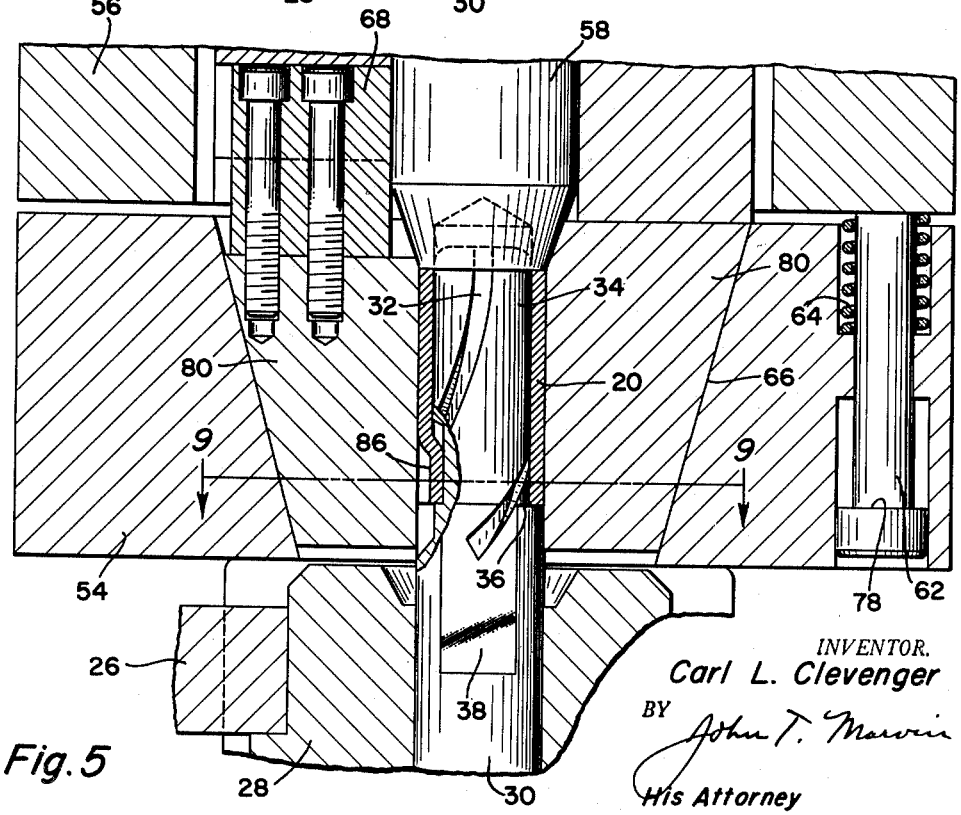
Figure 11:
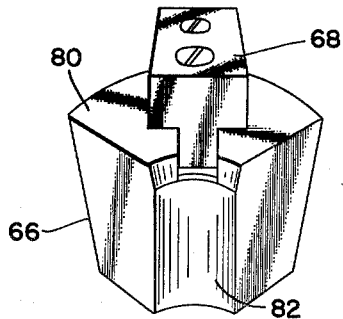
Figure 11 is a perspective view of one of the die segments used in the apparatus shown in Figures 5 and 9.

The apparatus in Figure 5 is essentially the same as shown in Figure 4 with the exception of the configuration and diameter of the surface 70 in the die segments 60. These die segments 80, most clearly shown in Figures 5 and 11, have a smooth concave surface 82 arranged to form a bore 84 which has a diameter substantially equal to the diameter of the portions of the tube which have been compressed in Figure 3. Thus, as the die segments 80 are moved inwardly by the apparatus as described in Figure 4, the metal which surrounds the kinked portions 86 of the collar, is inwardly folded. This inward folding of the material which formerly formed the collar 50 will cold flow and completely fill the grooves 32 in arbor 30. After the collar has been inwardly compressed by the apparatus shown in Figure 5 to restore the cylindrical shape of part 20, the punch holder 56, the die holder annulus 54, the punch 58, the die segments 80 and the arbor 30 are moved upwardly. The support 26 will then cause the arbor 30 to be sequentially moved beneath the apparatus shown in Figures 6 and 7.

Figure 6:
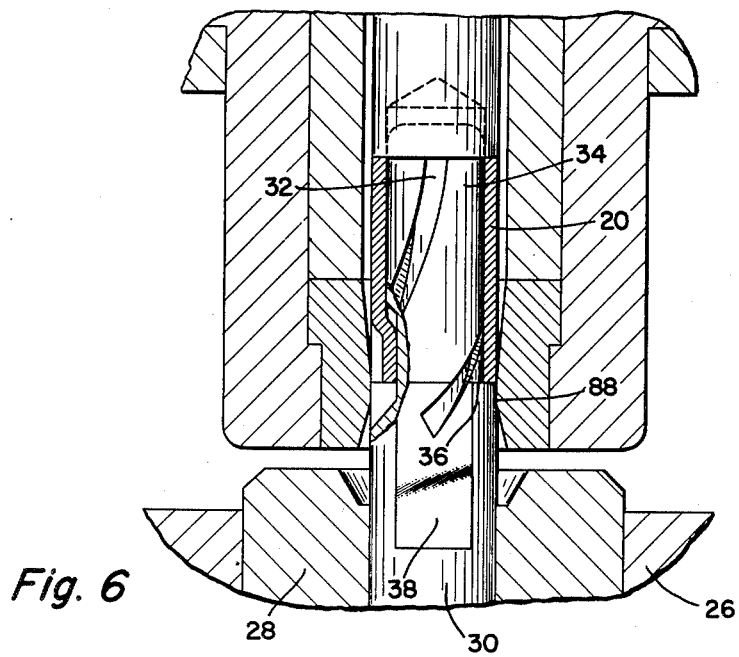
Figure 7:
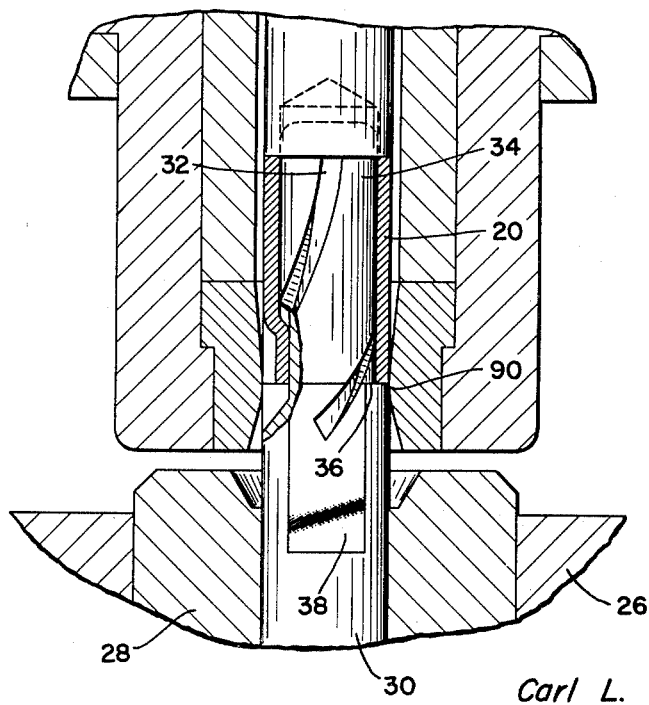

The apparatus in these Figures 6 and 7 has been essentially precedingly described in the Figure 3 with the exception that the bore, as defined by the inner diameter of the sizing dies 88 and 90, is smaller than the bore defined by the portion 48 of the die 40. Thus, the apparatus shown in Figure 7, will progressively reduce the diameter of the now cylindrical tube and will size it to a predetermined diameter while increasing its length. In connection with the apparatus shown in Figures 6 and 7, it is to be noted that the arbor 30 is also moved upwardly by an apparatus, not shown, so that the bores 88 and 90 may completely pass over the entire external walls of the part 20.

After the operations by the apparatus in Figure 7 have been performed, the support 26 will cause the arbor 30 to move out of alignment therewith so the formed part 22 may be removed from the arbor 30 by an apparatus, not shown. This apparatus preferably includes a plurality of gripping fingers which ride upon the flat surface 38 of arbor 30 to engage the bottom edge of the part and upwardly remove the part 22 from the arbor.

From the above, it is apparent that the apparatus as shown will cold form a cylindrical part as follows. In Figure 3, the part 20 which is pressed over the arbor 30 is partly compressed through the die 48 to form a collar 50 on the uncompressed portions of the part 20.

In Figure 4, the forming die inwardly deforms the collar portion 50 to form three spiralled grooves therein which are forced or kinked into cooperating grooves 32 in the arbor 30 while the remainder of the collar 50 remains untouched.

In Figure 5, the remaining portions of the collar 50 are inwardly deformed by the die segments 80 so that the metal at the grooves which has been kinked by the apparatus shown in Figure 5 is more or less inwardly folded.

In Figures 6 and 7, the entire sleeve is figuratively extruded by a draw die to size the sleeve to the proper finish dimension. After the above operations have been performed, the sleeve 22 is removed from the arbor to provide a finished part which has been cold formed.

In the apparatus shown, the support 26 has been used to move an arbor 30 beneath the various stationary apparatuses. Manifestly, the present invention comprehends an arrangement whereby the apparatuses are moved and the arbors remain stationary. Also, while the apparatus herein contemplated utilizes a rotary support 26, a reciprocating mechanism might be employed, if desired, to move the arbors 30 into proper positions so that the necessary operations might be performed. Further, if dies of different shapes than the dies shown are utilized to perform the operations set forth, these dies must be arranged to first kink the metal into the grooves before the material which surrounds the kinked portions is inwardly compressed; so the final part formed will have a smaller diameter and a greater length than the part which was initially operated upon.

While the embodiments of the present invention as herein disclosed constitute preferred forms, it is to be understood that other forms might be adopted.

What is claimed is as follows:

1. In a method for forming an internally splined sleeve, the steps comprising; loosely positioning a tubular metal part concentrically upon an arbor having a diameter smaller than the diameter of the tube and including a longitudinally extending groove along at least a portion of its surface, inwardly kinking a portion of the tube into the groove on said arbor and then uniformly compressing the remainder of the tube while the tube remains concentric with said arbor for conforming the remainder of the surface of the tube to the surface of the arbor whereby a tubular sleeve is formed having an inwardly facing spline therealong and finally removing the tube from the arbor.

2. In the method for cold forming a splined metal sleeve, the steps comprising; positioning a tubular metal part of predetermined length and diameter concentrically upon an arbor having a diameter less than the diameter of the sleeve and including a plurality of spiralled grooves in the surface thereof wherein the tube is out of contact with the arbor, inwardly compressing a portion of said sleeve against the smooth surface of the arbor for forming a collar thereon, inwardly compressing selected portions only of said collar into the grooves on said sleeve, uniformly compressing the remainder of the collar for completely filling the grooves by cold flow of the material in said sleeve into said grooves, and finally removing the splined sleeve from the arbor.

References Cited in the file of this patent

UNITED STATES PATENTS

| | | |
|---|---|---|
| 659,522 | Furbish | Oct. 9, 1900 |
| 1,761,521 | Eastman | June 3, 1930 |
| 1,924,734 | Brown | Aug. 29, 1933 |
| 1,963,057 | Wilcox | June 12, 1934 |
| 1,983,074 | Durell | Dec. 4, 1934 |
| 2,003,981 | Stanitz | June 4, 1935 |
| 2,104,319 | Dickie | Jan. 4, 1938 |
| 2,397,544 | Garand | Apr. 2, 1946 |
| 2,568,730 | Guthmann | Sept. 25, 1951 |
| 2,429,888 | Moore | Oct. 28, 1947 |
| 2,484,032 | Holm | Oct. 11, 1949 |
| 2,519,820 | Bruegger | Aug. 22, 1950 |